United States Patent
Yamashita (10) Patent No.: US 11,052,527 B2
(45) Date of Patent: Jul. 6, 2021

(54) TOOL

(71) Applicant: MAX CO., LTD., Tokyo (JP)

(72) Inventor: Michio Yamashita, Tokyo (JP)

(73) Assignee: MAX CO., LTD., Tokyo (JP)

( * ) Notice: Subject to any disclaimer, the term of this patent is extended or adjusted under 35 U.S.C. 154(b) by 95 days.

(21) Appl. No.: 15/354,296

(22) Filed: Nov. 17, 2016

(65) Prior Publication Data

US 2017/0144288 A1    May 25, 2017

(30) Foreign Application Priority Data

Nov. 20, 2015   (JP) .............................. JP2015-228224

(51) Int. Cl.
*B25F 5/00*     (2006.01)
*G01L 1/22*     (2006.01)

(52) U.S. Cl.
CPC ................ *B25F 5/001* (2013.01); *B25F 5/00* (2013.01); *G01L 1/22* (2013.01)

(58) Field of Classification Search
CPC .................................. B25F 5/001; B25F 5/00
USPC .................................................. 173/18, 170
See application file for complete search history.

(56) References Cited

U.S. PATENT DOCUMENTS

| | | | | |
|---|---|---|---|---|
| 3,632,936 A * | 1/1972 | Piber | ...................... | H01H 1/403 173/170 |
| 4,667,119 A * | 5/1987 | Holmes | ................... | H01H 13/08 173/170 |
| 5,581,165 A * | 12/1996 | Laio | ......................... | B25B 21/00 318/261 |
| 8,240,393 B2 * | 8/2012 | Schmehl | ................. | B25F 5/001 173/170 |
| 9,914,204 B2 * | 3/2018 | Hosking | ................... | B25F 5/00 |
| 2003/0146900 A1 | 8/2003 | Endo et al. | | |
| 2010/0206706 A1 * | 8/2010 | Buettner | ................ | H01H 9/226 200/400 |

(Continued)

FOREIGN PATENT DOCUMENTS

| | | |
|---|---|---|
| CN | 1199915 A | 11/1998 |
| CN | 1437091 A | 8/2003 |

(Continued)

OTHER PUBLICATIONS

Extended European Search Report dated Apr. 24, 2017 in corresponding European patent application 16002439.4 (8 pages).

(Continued)

*Primary Examiner* — Dariush Seif
*Assistant Examiner* — Daniel Jeremy Leeds
(74) *Attorney, Agent, or Firm* — Rothwell, Figg, Ernst & Manbeck, P.C.

(57) ABSTRACT

A tool includes a switch. The switch is configured to cause an electric component to operate. The switch includes a switch manipulation part, a load sensor and a load adjusting mechanism. The switch manipulation part is configured to manipulate the switch. The load sensor is configured to detect a load corresponding to a pressing force according to a manipulation of the switch manipulation part. The load adjusting mechanism is configured to move the load sensor relative to the switch manipulation part along a direction where the switch manipulation part and the load sensor are separated from each other, according to a magnitude of the pressing force applied to the load sensor.

15 Claims, 6 Drawing Sheets

(56) References Cited

U.S. PATENT DOCUMENTS

| | | | | |
|---|---|---|---|---|
| 2010/0319944 A1 | 12/2010 | Schmehl | | |
| 2011/0168420 A1* | 7/2011 | Kobayashi | ............. | H01H 9/047 |
| | | | | 173/170 |
| 2012/0068633 A1* | 3/2012 | Watanabe | ............... | B25F 5/001 |
| | | | | 318/3 |
| 2012/0160529 A1* | 6/2012 | Eshleman | ............... | B25B 21/00 |
| | | | | 173/1 |
| 2012/0293103 A1* | 11/2012 | Forster | ...................... | B25F 5/00 |
| | | | | 318/503 |
| 2013/0075123 A1* | 3/2013 | Sun | .......................... | B25F 5/00 |
| | | | | 173/221 |
| 2013/0161161 A1 | 6/2013 | Parrinello et al. | | |
| 2013/0249463 A1* | 9/2013 | Nishikimi | ................. | B25F 5/00 |
| | | | | 318/504 |
| 2013/0271054 A1* | 10/2013 | Watanabe | ............... | B25B 21/00 |
| | | | | 318/490 |
| 2014/0110450 A1 | 4/2014 | Moore et al. | | |
| 2014/0252881 A1* | 9/2014 | Dinh | ...................... | H01H 13/06 |
| | | | | 307/125 |
| 2014/0352995 A1 | 12/2014 | Matsunaga et al. | | |
| 2015/0282337 A1* | 10/2015 | Ekstrom | ................ | H01H 21/12 |
| | | | | 173/170 |

FOREIGN PATENT DOCUMENTS

| | | |
|---|---|---|
| CN | 101224571 A | 7/2008 |
| CN | 204732314 U | 10/2015 |
| DE | A1-102012219299 | 4/2014 |
| EP | 2 324 961 B1 | 5/2011 |
| EP | A2-2431987 | 3/2012 |
| JP | 63-199425 U | 12/1988 |
| JP | 05-034624 U | 5/1993 |
| JP | 07220563 A | 8/1995 |
| JP | 2012-101326 A | 5/2012 |
| TW | 201115605 A | 5/2011 |
| WO | WO-A1-2015-053873 | 4/2015 |

OTHER PUBLICATIONS

Office Action in CN 201611020093.X dated Jul. 1, 2020, 6 pages.

Office Action for CN Application No. 201611020093.X dated Feb. 20, 2021 (8 pages).

Electronic Components (Secondary Vocational Edition)-Wang Mingtian, Xie Zhongfu, Beihang University Press (7 pages including English translation).

* cited by examiner

FIG.6 ns bit to the output shaft 46*a*, the driving force of the motor 20 causes the driver bit to rotate and to be struck.

Figure 1:
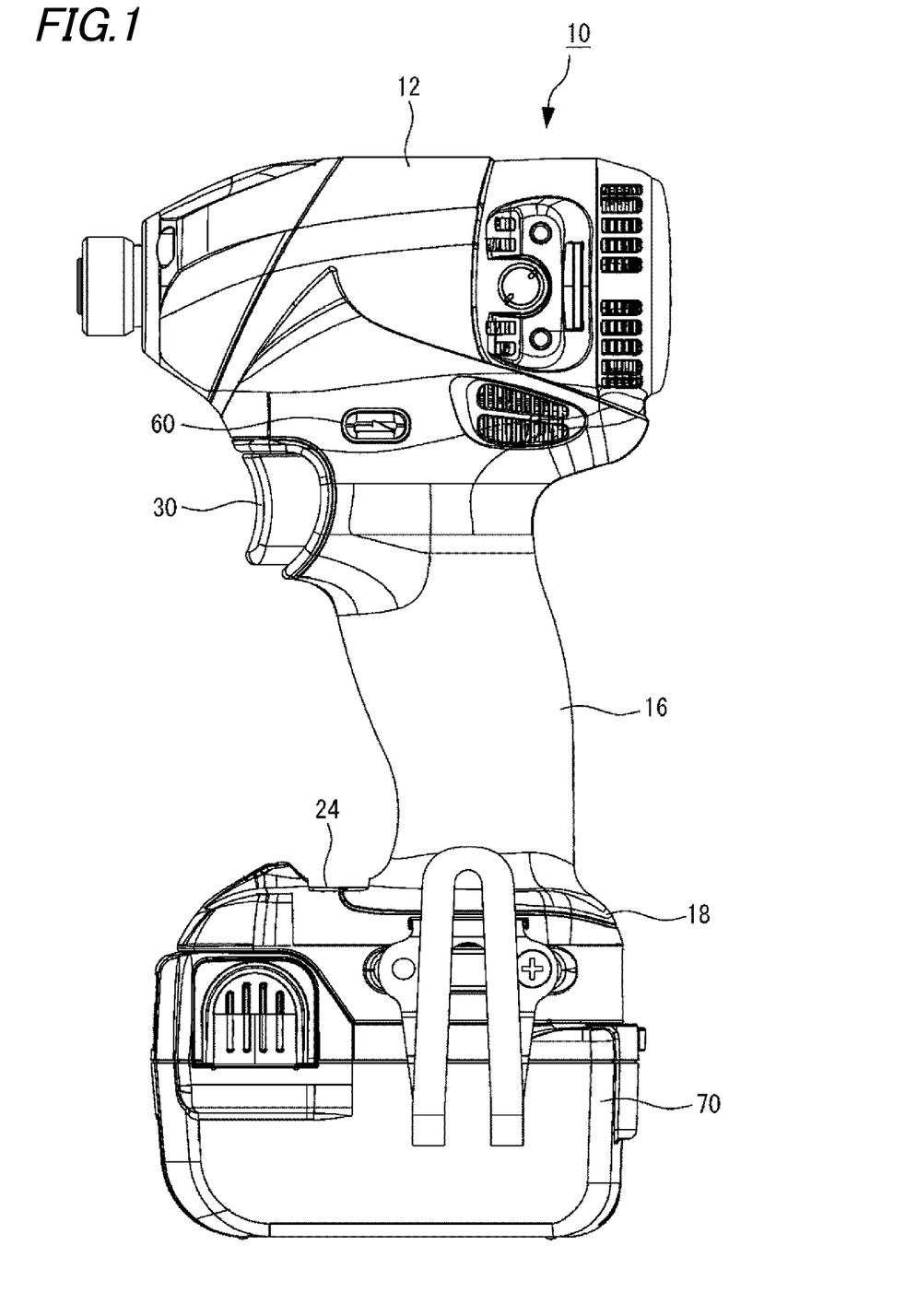
Figure 2:
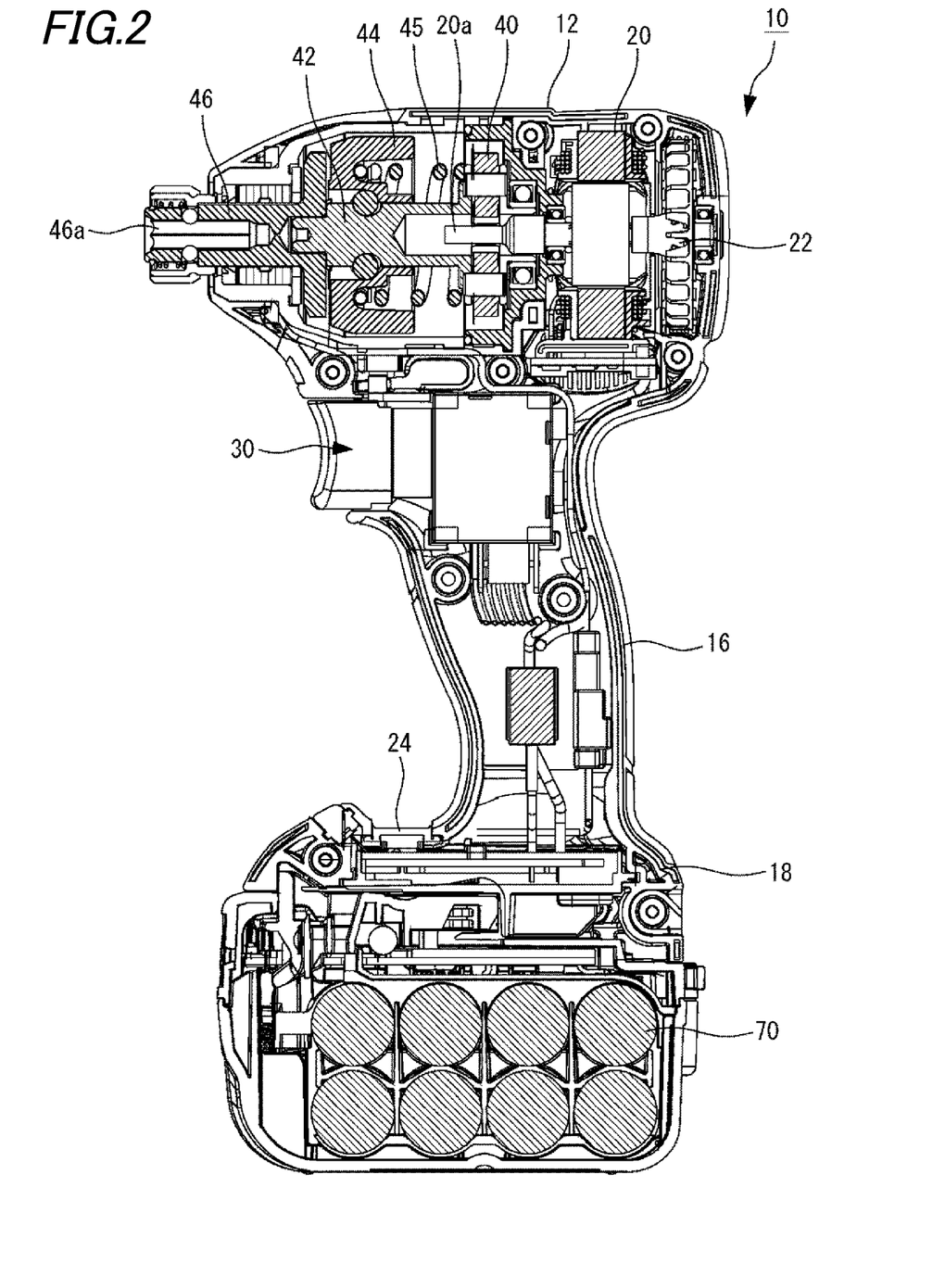

The grip 16 is a part for gripping the electric tool 10. A battery pack attaching part 18 to which a battery 70 can be attached in a mountable manner is provided in the lower portion of the grip 16. FIGS. 1 and 2 illustrate a state where the battery 70 is attached to the battery pack attaching part 18. A residual capacity gauge is provided in the battery 70 so that battery residual capacity can be recognized visually.

An operation panel 24 is provided in the upper surface portion of the portion which extends to the front side of the battery pack attaching part 18. The operation panel 24 includes a mode setting button for switching a strike mode, and the like.

A switch 30 is disposed on the front side of the upper portion of the grip 16, and is provided in a position where a forefinger is crooked when a user grips the grip 16. The rotation amount of the motor 20 can be controlled according to the pressuring motion (pull operation) of the user with respect to the switch 30.

[Configuration Example of Switch 30]

Figure 3:
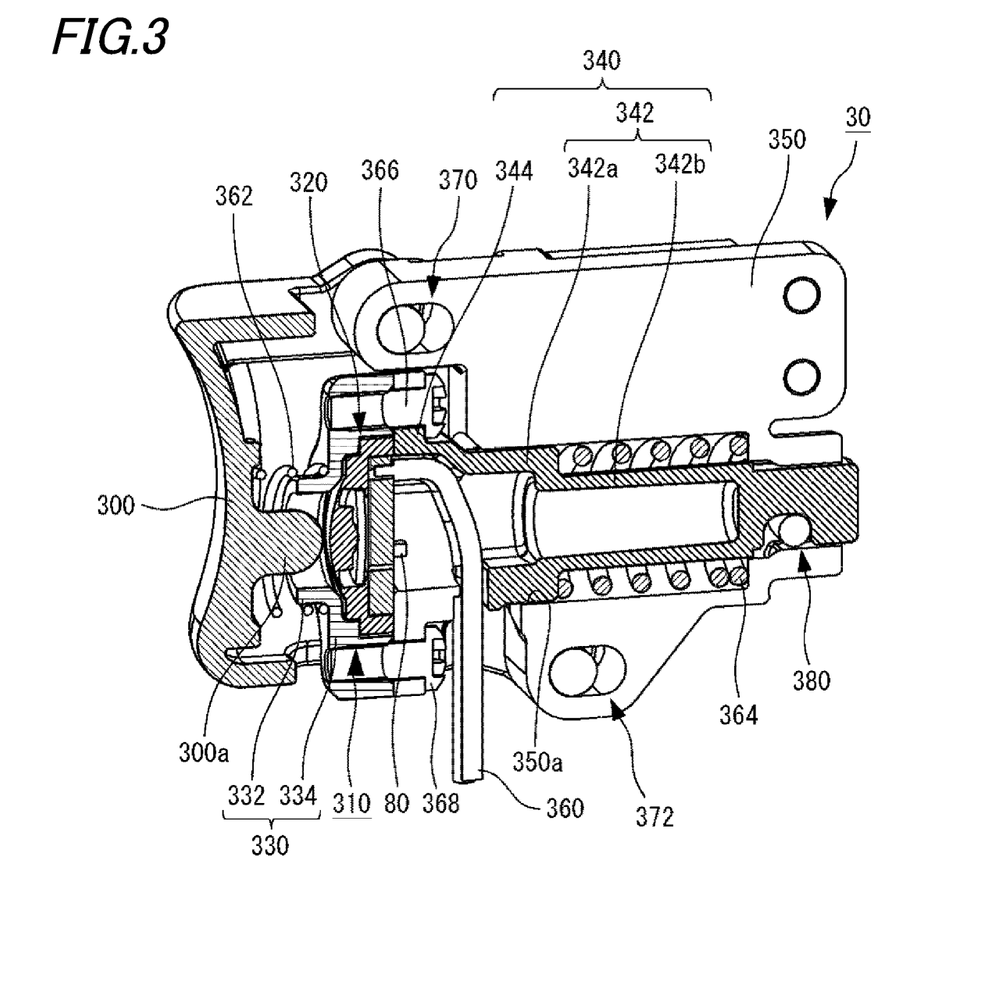
Figure 4:
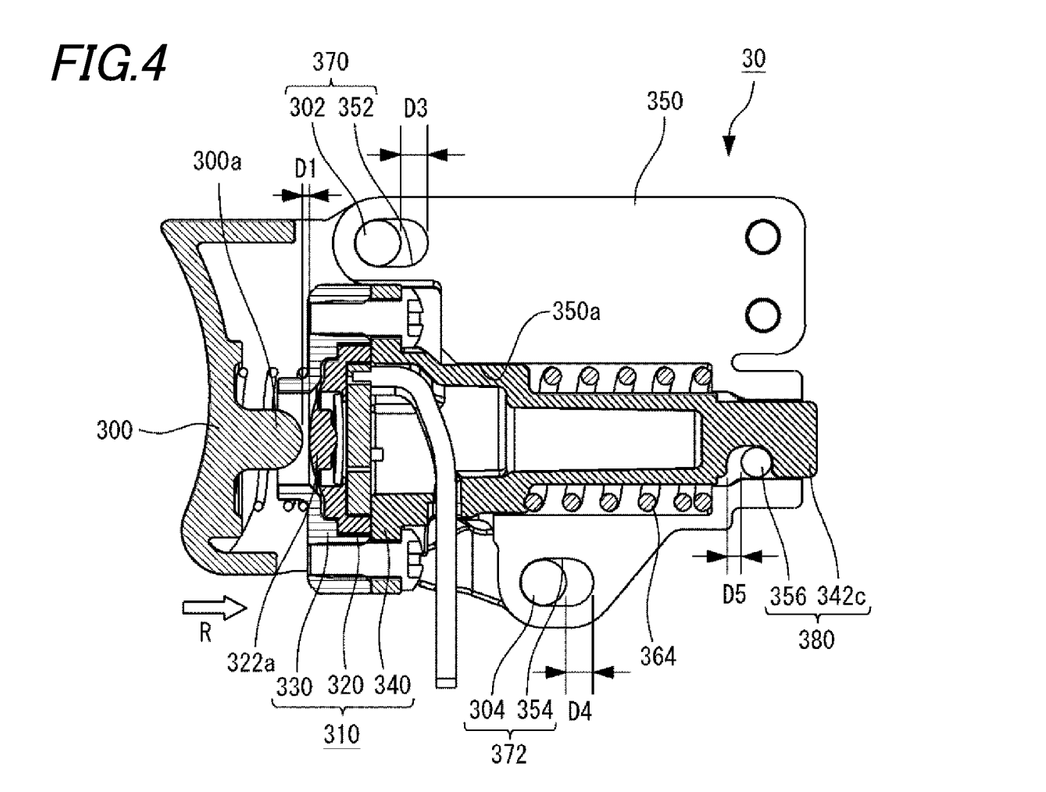

FIGS. 3 and 4 illustrate an example of a configuration of the switch 30. As illustrated in FIGS. 3 and 4, the switch 30 includes the trigger 300, a sensor unit 310, a fixing member 350, a temperature sensor 80, and regulating parts 370, 372, and 380. The trigger 300 disclosed in the present invention is an example of an operation part, and the fixing member 350 is an example of a supporting member.

The trigger 300 is a member which is used for the user to turn on/off the electric tool 10 and to adjust the rotation amount of the motor 20. The trigger 300 is configured to be as a switch manipulation part. The trigger 300 has a curved front surface such that the user easily applies pressure with a finger. A protrusion 300*a* protruding toward the sensor unit 310 is provided in the rear surface (back surface) of the trigger 300. The protrusion 300*a* is moved toward the sensor unit 310 when the user performs the pressure operation on the trigger 300, and presses a load sensor 320 (to be described later). A coil spring 362 is inserted between the trigger 300 and a load sensor covering member 330 (to be described later), and biases the trigger 300 in an opposite direction to a pressing direction R.

Figure 5:
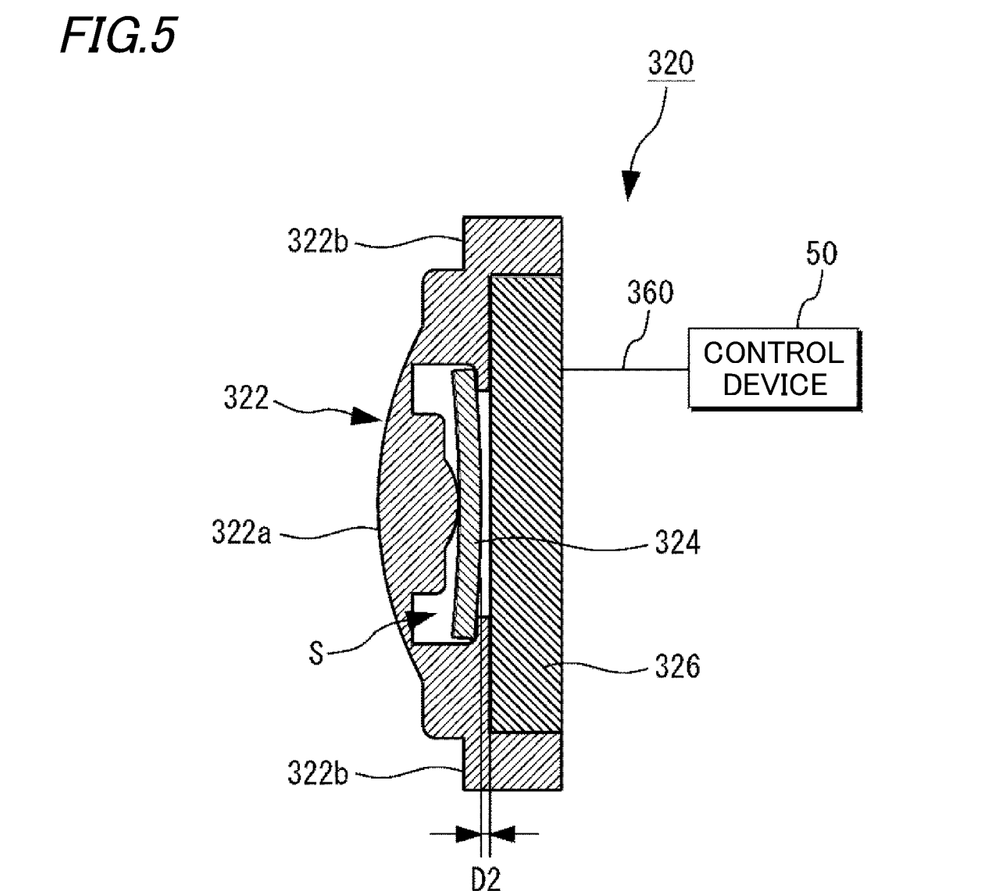

The sensor unit 310 includes the load sensor 320, the load sensor covering member 330, and a load sensor supporting member 340. FIG. 5 illustrates an example of the sectional configuration of the load sensor 320. As illustrated in FIG. 5, the load sensor 320 includes the sealing cover 322, a pressure-sensitive conductive elastic member 324, and a substrate 326.

The sealing cover 322 is formed, for example, of soft resin material which can be bent and deformed elastically. The sealing cover 322 includes a pressure portion 322*a* and a sealing portion 322*b* formed integrally therewith. The pressure portion 322*a* has a front surface side and a rear surface side, each of which protrudes in a hemispherical shape (dome shape). The protrusion on the front surface side is advanced and retreated elastically by being pressed by the trigger 300, and the protrusion on the rear surface side presses the pressure-sensitive conductive elastic member 324. The pressure portion 322*a* is provided to be separated by a distance D1 from the protrusion 300*a* of the trigger 300 in order to prevent an erroneous operation (see FIG. 4). The sealing portion 322*b* is provided to surround the entire circumference of the outer edge portion of the substrate 326, and has a function to secure a waterproof property in the load sensor 320.

The pressure-sensitive conductive elastic member (movable contact) 324 is disposed between the sealing cover 322 and the substrate 326, and is formed of a planar conductive member which can be bent and deformed elastically. As the conductive member, for example, a pressure-sensitive conductive member in which electric conductivity is changed according to pressure may be used in addition to a metallic conductive member. For example, a pressure-sensitive member in which conductive fine particles such as carbon, metal powders, and metal deposition powders are dispersed to a rubber material may be preferably used. The pressure-sensitive conductive elastic member 324 abuts on the substrate 326 by being bent by a pressing force received from the sealing cover 322. In this embodiment, the pressure-sensitive conductive elastic member (movable contact) 324 and the sealing cover 322 are configured in the contact state, but may be separated from each other.

The substrate 326 is formed, for example, of a material such as a glass epoxy plate, and is disposed a certain distance D2 away from the pressure-sensitive conductive elastic member 324. A plurality of conductor patterns (not illustrated) are formed on the front surface side of the substrate 326 to form fixed contacts. When the pressure-sensitive conductive elastic member 324 is compressed in the state of abutting on the conductor patterns, a resistance value is changed according to a compression load (deformation amount) so that the substrate 326 becomes conductive. An electric signal based on the conduction is output to a control device 50 (to be described later) through a wire 360 connected to the substrate 326. When the deformation amount of the pressure-sensitive conductive elastic member 324 is increased by the increase of the load, the resistance value is decreased. In this manner, it is possible to detect the resistance value with respect to the load corresponding to the pressing force of the user to the trigger 300.

Returning to FIGS. 3 and 4, the load sensor covering member 330 secures a sealing property and a waterproof property of the load sensor 320 by covering the load sensor 320. The load sensor covering member 330 includes a cylindrical portion 332, and a flange portion 334 formed integrally therewith. In the cylindrical portion 332, the pressure portion 322*a* (see FIG. 5) is exposed so that the protrusion 300*a* can press the pressure portion 322*a*. The flange portion 334 is provided to extend outward from the outer edge of the cylindrical portion 332, and to cover the entire circumstance of the outer edge portion of the sealing cover 322.

The load sensor supporting member 340 is a member for supporting the load sensor 320, and includes a cylindrical portion 342 and a flange portion 344 formed integrally therewith. The cylindrical portion 342 is a cylindrical member including a step portion, and includes a large diameter cylindrical portion 342*a* and a small diameter cylindrical portion 342*b* connected thereto. The flange portion 344 extends from the front outer edge of the large diameter cylindrical portion 342*a*, and abuts on each of the flange portion 334 of the load sensor covering member 330 and the sealing portion 322*b* of the sealing cover 322 (see FIG. 5).

The flange portion 334 of the load sensor covering member 330 and the flange portion 344 of the load sensor supporting member 340 are fastened by screws 366 and 368 in a state where the sealing portion 322*b* of the sealing cover 322 is interposed therebetween. In this manner, the load sensor 320 is configured as an integral unit structure contained in the load sensor covering member 330 and the load sensor supporting member 340 (sensor unit 310), thereby securing the sealing property and the waterproof property of the load sensor 320.

The fixing member 350 is fixed to an attachment portion (not illustrated) provided in the electric tool body 12, and regulates the movement of the trigger 300 and the sensor unit 310 in the pressing direction R. The fixing member 350 includes a guide part 350a for guiding the movement of the sensor unit 310. The guide part 350a is provided in the inner circumferential surface of the fixing member 350, and contacts the outer circumferential surface of the cylindrical portion 342 so that the sensor unit 310 can move linearly in the pressing direction R. A spring 364 is inserted between the outer circumferential surface of the small diameter cylindrical portion 342b of the load sensor supporting member 340 and the inner circumferential surface of the fixing member 350. The sensor unit 310 is supported elastically by the coil spring 364.

The coil spring 364 is disposed coaxially with the load sensor 320, and is elastically deformed when a certain load or more is applied to the load sensor 320 by pressure of the user with respect to the trigger 300. That is, the coil spring 364 is configured to move the load sensor 320 relative to the trigger 300 along a direction where the trigger 300 and the load sensor 320 are separated from each other, according to a magnitude of the pressing force applied to the load sensor 320. In this manner, the sensor unit 310 can be configured to be movable to the fixing member 350, and the pressing force received by the trigger 300 can be accurately transmitted to the load sensor 320. Therefore, it is possible to improve the sensitivity of the load sensor 320. The coil spring 364 disclosed in the present invention is an example of an elastic member and a load adjusting mechanism.

The temperature sensor 80 is configured, for example, as a thermistor, and is provided in the rear surface (back surface) side of the substrate 326 forming the load sensor 320. The temperature sensor 80 may measure an ambient temperature in a state where the electric tool 10 is used after turning on a power supply without being limited to the above-described attachment position of the rear surface of the substrate 326. The ambient temperature includes, for example, an ambient temperature of the load sensor 320 in the electric tool body 12, and an environmental temperature near the electric tool body 12.

As illustrated in FIG. 4, the regulating parts 370 and 372 are respectively provided the upper portion and lower portion of the inside of the switch 30, and regulate the movement distance of the trigger 300 according to the pressure of the user to be less than the maximum movement distance of the sensor unit 310.

The regulating part 370 includes a protrusion 302 provided in the trigger 300 and a long hole 352 which is provided in the fixing member 350 and extends in the pressing direction R of the trigger 300. The protrusion 302 is a columnar member protruding from the inner surface of the trigger 300 toward the fixing member 350, and is engaged to be slidable in the long hole 352. A movement distance (stroke) D3 of the protrusion 302 of the trigger 300 in the long hole 352 is less than the maximum movement distance (stroke) of the sensor unit 310 in the pressing direction R. A distance (a range where a load is applied to the load sensor 320), which is obtained by subtracting the distance D1 as a malfunction suppressing space from the movement distance D3 of the trigger 300, is smaller than a movable distance of the sensor unit 310.

The regulating part 372 will be not described in detail because the regulating part 372 has the same configuration as the regulating part 370. The regulating part 372 includes a protrusion 304 and a long hole 354. The protrusion 304 is engaged to be slidable in the long hole 354. A movement distance D4 of the protrusion 304 of the trigger 300 in the long hole 354 is less than the maximum movement distance of the sensor unit 310 in the pressing direction. The movement distance D3 is the same as the movement distance D4.

The regulating part 380 is provided in the rear portion of the switch 30. The regulating part 380 prevents the sensor unit 310 from coming off from the coil spring 364, and regulates the movement amount of the sensor unit 310. The regulating part 380 includes a protrusion 356 provided in the fixing member 350, and a hook portion 342c provided in the load sensor supporting member 340.

The hook portion 342c includes a recess concave downward, and is formed integrally with the rear end portion of the load sensor supporting member 340. The protrusion 356 is a columnar member which protrudes from the inner surface of the fixing member 350 toward the load sensor supporting member 340, and is engaged to the hook portion 342c in a movable manner. A movement distance D5 of the protrusion 356 in the hook portion 342c is set to such a length that the sensor unit 310 is movable even when the stroke of the trigger 300 reaches a limit.

A summary of the above-described relation between the movement distance D3 of the trigger 300 and the movement distance D5 of the sensor unit 310 is as follows. A gap (distance D1) for preventing a malfunction is formed between the trigger 300 and the sealing cover 322, and an insulating space (distance D2) is formed between the pressure-sensitive conductive elastic member 324 and the substrate 326. If the distance D2 as a gap can be secured in an initial state where the trigger 300 is not pressed, the distance D1 as a malfunction suppressing space may not be provided. Herein, the malfunction suppressing space D1 is provided in consideration of tolerance accumulation. For this reason, the movement distance D3 of the trigger 300 is set in the range of 0 mm to 3 mm. In this manner, the movement distance D5 where the sensor unit 310 is movable is set to be 3 mm or more.

[Motion Example of Switch 30]

Figure 6:
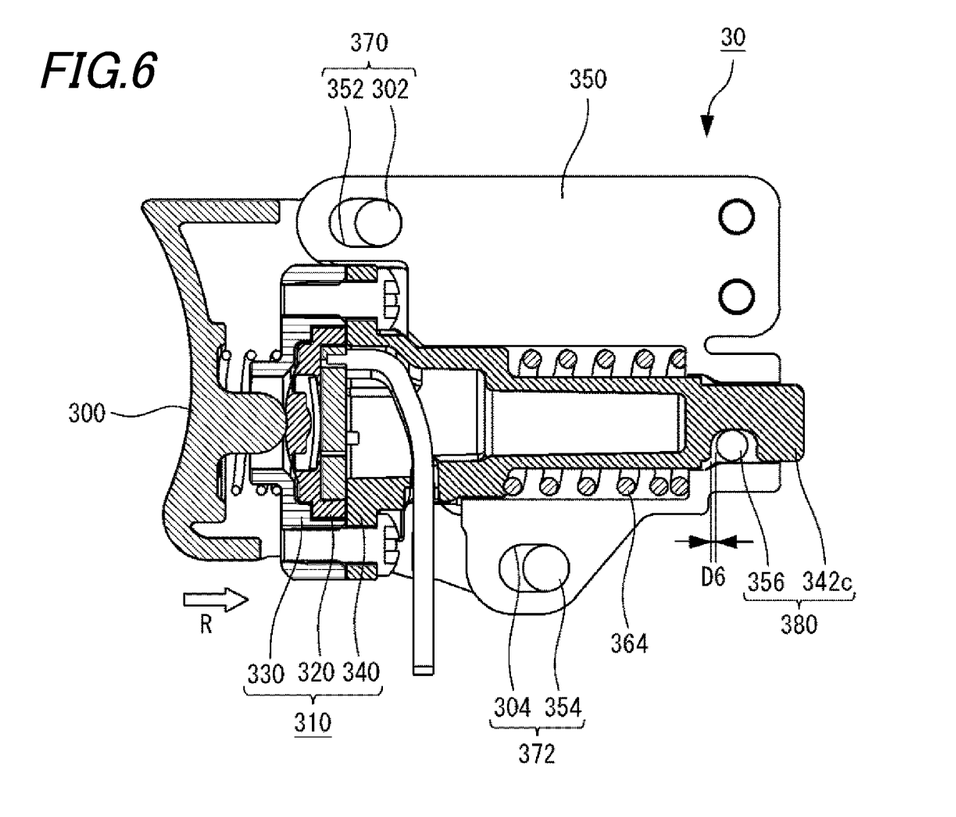

Next, a motion example of the switch 30 will be described with reference to FIGS. 3 and 6. FIG. 6 illustrates an example of a motion of pulling the switch 30. In a state before the trigger 300 is pressed by the user, the trigger 300 and the sealing cover 322 are separated by the distance D1 from each other, and the pressure-sensitive conductive elastic member 324 and the substrate 326 are separated by the distance D2 from each other. In this case, the load sensor 320 is in a non-conductive state. Before the trigger 300 is pressed, the coil spring 364 biases the sensor unit 310 toward the trigger 300, but the hook portion 342c is locked by the protrusion 356. In this manner, it is possible to prevent the sensor unit 310 from coming off from the fixing member 350.

When the user performs the pressure operation on the trigger 300, the trigger 300 moves in the pressing direction R, and the protrusion 300a of the trigger 300 abuts on the pressure portion 322a of the sealing cover 322 and presses the pressure portion 322a. When the trigger 300 is further pressed, the pressure portion 322a of the sealing cover 322 presses the pressure-sensitive conductive elastic member 324. In this manner, the pressure-sensitive conductive elastic member 324 is elastically deformed and bent to contact the substrate 326. That is, the trigger 300 (protrusions 302 and 304) moves by the displacement amount allowed in the distances D1 and D2 in the pressing direction R.

As illustrated in FIG. 6, when the user further performs the pressure operation on the trigger 300, and a load equal to or more than the attachment load of the coil spring 364 is applied to the trigger 300, the coil spring 364 is compressed, and the sensor unit 310 containing the load sensor 320 moves in the pressing direction R (rearward). In this manner, it is possible to prevent a load equal to or more than the coil spring 364 from being applied to the load sensor 320.

When the trigger 300 moves by the distance D3, the protrusions 302 and 304 are regulated by the long holes 352 and 354. However, as illustrated in FIG. 6, even in a case where the trigger 300 moves by the maximum distance, the protrusion 356 in the hook portion 342c is in the state of being movable by a distance D6. That is, the sensor unit 310 is configured to be movable with a margin of the distance D6 to the fixing member 350. In this manner, it is possible to prevent the damage and the like of the load sensor 320 even in a case where an excessive load is applied to the load sensor 320.

As illustrated above, in this embodiment, the regulating parts 370 and 372 are provided such that the trigger 300 reaches a stroke limit before the sensor unit 310 reaches a stroke limit even in a case where a load equal to or more than the attachment load of the coil spring 364 is applied to the trigger 300 to move the sensor unit 310 containing the load sensor 320. Therefore, it is possible to prevent a load equal to or more than the coil spring 364 from being applied to the load sensor 320.

As a result, the damage of the load sensor 320 can be avoided although an excessive load is applied to the load sensor 320.

In this embodiment, the regulating part 380 is provided such that the hook portion 342c is locked by the protrusion 356, and thus it is possible to prevent the sensor unit 310 from coming off from the fixing member 350.

The sensor unit 310 is movable even when the stroke of the trigger 300 reaches a limit, and it is possible to prevent the damage of the load sensor 320 and the like.

In this embodiment, the load sensor 320 is configured as an integral unit structure contained in the load sensor covering member 330 and the load sensor supporting member 340, and thus it is possible to simplify a waterproof structure of the load sensor 320.

In this manner, it is possible to achieve simplification of assembly as well as reduction in size of the switch 30, and it is possible to achieve reduction in cost of the electric tool 10.

The technical range of the present invention is not limited to the above-described embodiments, and the above-described embodiments may be modified in various forms without departing from the scope of the present invention. The description has been given about an example that the rubber load sensor of the pressure-sensitive type is used as an example of the load sensor 320, but the invention is not limited thereto. The present invention may be applied also to the case of using a semiconductor-type load sensor, or a strain gauge-type load sensor.

In the regulating parts 370 and 372 of the above-described embodiment, the relation between the protrusions 302 and 304 and the long holes 352 and 354 may be configured adversely.

Similarly, the protrusion 356 and the hook portion 342c of the regulating part 380 may be configured adversely.

The impact driver has been described as the electric tool 10, but the invention is not limited thereto. The present invention may be applied also to an electric driver, an electric saw, an electric file, and the like which have no strike mechanism.

The power supply is not limited to the battery 70, and an AC power supply through a power cable may be adopted.

(1) A tool comprising:
a switch that is configured to cause an electric component to operate, wherein
the switch includes:
a switch manipulation part that is configured to manipulate the switch;
a load sensor that is configured to detect a load corresponding to a pressing force according to a manipulation of the switch manipulation part; and
a load adjusting mechanism that is configured to move the load sensor relative to the switch manipulation part along a direction where the switch manipulation part and the load sensor are separated from each other, according to a magnitude of the pressing force applied to the load sensor.

(2) The tool according to (1), wherein
the load adjusting mechanism is configured to move the load sensor along a pressing direction of the switch manipulation part.

(3) The tool according to (2), further comprising:
a regulating part that is configured to regulate a movement range of the switch manipulation part to be less than a movement range of the load sensor.

(4) The tool according to any one of (1) to (3), wherein
the load adjusting mechanism includes an elastic member which is configured to support the load sensor, and
the elastic member is arranged coaxially with the load sensor.

(5) The tool according to any one of (2) to (4), wherein
when the switch manipulation part is pressed along the pressing direction to apply a predetermined load to the switch manipulation part, the load adjusting mechanism is configured to move the load sensor along the pressing direction.

(6) The tool according to any one of (2) to (5), wherein
when the the switch manipulation part is pressed along the pressing direction, the load sensor detects the load corresponding the pressing force, and
when the switch manipulation part is further pressed along the pressing direction to apply the predetermined load to the switch manipulation part, the load adjusting mechanism is configured to move the load sensor along the pressing direction.

What is claimed is:
1. A tool comprising:
a tool body;
a switch that is configured to cause an electric component to operate, wherein
the switch includes:
a switch manipulation part that is configured to manipulate the switch;
a load sensor that is configured to detect a load corresponding to a pressing force, wherein the switch manipulation part presses a first end of the load sensor according to a manipulation of the switch manipulation part, wherein at least in a first position, the switch manipulation part and the load sensor are physically unengaged and separated from each other in a first direction, wherein at least in a second position, the switch manipulation part physically engages the first end of the load sensor;

a load sensor supporting member which is provided to the tool body to be slidable in the first direction and is configured to support the load sensor; and a load adjusting mechanism configured to be elastically deformed when a certain load or more is applied and to transmit load received by the switch manipulation part to the load sensor, wherein the load adjusting mechanism includes an elastic member that is configured to elastically support the load sensor supporting member to be slidable in the first direction to allow the load sensor to move in the first direction in response to actuation of the switch manipulation part in the first direction, according to a magnitude of the pressing force applied to the load sensor, wherein a first end of the load adjusting mechanism faces a second end of the load sensor, wherein the second end of the load sensor is opposite the first end of the load sensor.

2. The tool according to claim 1, wherein
the load adjusting mechanism elastically supports the load sensor supporting member supporting the load sensor during movement of the load sensor along a pressing direction of the switch manipulation part.

3. The tool according to claim 2, further comprising:
a regulating part that is configured to regulate a movement range of the switch manipulation part to be less than a movement range of the load sensor.

4. The tool according to claim 1, wherein
the elastic member is arranged coaxially with the load sensor.

5. The tool according to claim 2, wherein
when the switch manipulation part is pressed along the pressing direction to apply a predetermined load to the switch manipulation part, the load adjusting mechanism is configured to move the load sensor supporting member supporting the load sensor along the pressing direction.

6. The tool according to claim 5, wherein
when the switch manipulation part s pressed along the pressing direction, the load sensor detects the load corresponding to the pressing force, and
when the switch manipulation part is further pressed along the pressing direction to apply the predetermined load to the switch manipulation part, the load adjusting mechanism elastically supports the load sensor supporting member to slide in the first direction to allow the load sensor to move along the pressing direction.

7. The tool according to claim 1, wherein the load sensor includes an elastic cover which seals the load sensor, and wherein the switch manipulation part contacts the elastic cover during movement of the switch manipulation part pressing direction of the switch manipulation part.

8. The tool according to claim 1, wherein the load sensor supporting member includes a cylindrical portion and wherein the cylindrical portion comprises a large diameter portion on one side of the cylindrical portion and a small diameter portion on a side of the cylindrical portion opposite to the large diameter portion.

9. The tool according to claim 8, wherein the elastic member is a helical spring, and the helical spring surrounds the small diameter portion.

10. The tool according to claim 1, wherein the load sensor is located between the load sensor supporting member and the switch manipulation part.

11. The tool according to claim 1, wherein the load sensor is positioned between the switch manipulation part and the elastic member.

12. The tool according to claim 1, wherein the load sensor includes a sealing cover, and the switch manipulation part contacts the sealing cover during movement of the switch manipulation part in a pressing direction of the switch manipulation part.

13. The tool according to claim 12, wherein the load sensor includes a pressure sensitive elastic member inside the sealing cover which bends in response to contact of the switch manipulation part against the sealing cover; and
the load sensor is positioned between the switch manipulation part and the elastic member of the load adjusting mechanism.

14. The tool according to claim 1, wherein the load sensor is spaced apart from the elastic member of the load adjusting mechanism.

15. The tool according to claim 1, wherein the load sensor supporting member configured to support the load sensor from a side opposite to the switch manipulation part with respect to the load sensor.

* * * * *